United States Patent
Beall et al.

(12)

(10) Patent No.: US 9,110,503 B2
(45) Date of Patent: Aug. 18, 2015

(54) PRECISION POSITION TRACKING DEVICE

(71) Applicant: WorldViz LLC, Santa Barbara, CA (US)

(72) Inventors: Andrew C. Beall, Santa Barbara, CA (US); Matthias Pusch, Bavaria (DE)

(73) Assignee: WORLDVIZ LLC, Santa Barbara, CA (US)

( * ) Notice: Subject to any disclaimer, the term of this patent is extended or adjusted under 35 U.S.C. 154(b) by 28 days.

(21) Appl. No.: 14/073,037

(22) Filed: Nov. 6, 2013

(65) Prior Publication Data

US 2014/0152550 A1 Jun. 5, 2014

Related U.S. Application Data

(60) Provisional application No. 61/731,894, filed on Nov. 30, 2012.

(51) Int. Cl.
*G06F 3/01* (2006.01)
*G06F 3/00* (2006.01)

(52) U.S. Cl.
CPC ............... *G06F 3/012* (2013.01); *G06F 3/005* (2013.01)

(58) Field of Classification Search
CPC ........... G09G 5/10; G09G 5/00; G09G 5/377; G06Q 30/04; G06F 3/01; G06F 3/012
See application file for complete search history.

(56) References Cited

U.S. PATENT DOCUMENTS

| | | | |
|---|---|---|---|
| 6,574,352 B1 | 6/2003 | Skolmoski | |
| 6,720,949 B1 | 4/2004 | Pryor et al. | |
| 7,719,484 B2 | 5/2010 | Turner et al. | |
| 8,472,120 B2 | 6/2013 | Border et al. | |
| 8,482,859 B2 | 7/2013 | Border et al. | |
| 8,570,378 B2 | 10/2013 | Zalewski et al. | |
| 2002/0036617 A1 | 3/2002 | Pryor | |
| 2010/0311512 A1 | 12/2010 | Lock et al. | |
| 2012/0156652 A1 | 6/2012 | Lane et al. | |
| 2012/0178054 A1 | 7/2012 | Jomander et al. | |
| 2012/0194419 A1 | 8/2012 | Osterhout et al. | |
| 2012/0194420 A1 | 8/2012 | Osterhout et al. | |
| 2012/0194549 A1 | 8/2012 | Osterhout et al. | |
| 2012/0194551 A1 | 8/2012 | Osterhout et al. | |
| 2012/0194552 A1 | 8/2012 | Osterhout et al. | |
| 2012/0200601 A1 | 8/2012 | Osterhout et al. | |
| 2012/0206334 A1* | 8/2012 | Osterhout et al. | 345/156 |
| 2012/0212406 A1 | 8/2012 | Osterhout et al. | |
| 2012/0212499 A1* | 8/2012 | Haddick et al. | 345/589 |

* cited by examiner

*Primary Examiner* — Michael Faragalla
(74) *Attorney, Agent, or Firm* — Knobbe, Martens, Olson & Bear LLP

(57) ABSTRACT

Embodiment of a lightweight and compact wireless precision position tracking device and a precision position tracking motion capture system are described. Optionally, the wireless precision position tracking device is configured to be worn by a user. The wireless precision position tracking device may be configured to emit optical light from two or more respective markers, where the light from one of the markers is distinguishable from light from another of the markers.

20 Claims, 5 Drawing Sheets

PRECISION POSITION TRACKING DEVICE

CROSS-REFERENCE TO RELATED APPLICATIONS

The present application claims priority from U.S. Provisional Application No. 61/731,894, filed Nov. 30, 2012, the contents of which are hereby incorporated by reference in their entirety.

BACKGROUND OF THE INVENTION

A conventional immersive Virtual Reality system generally includes a head mounted display or special purpose glasses (e.g., 3D glasses) used to view a display, a motion capture mechanisms (e.g., two special purpose Infrared Red tracking cameras), a real-time image generator, and a wireless or wired input device. The input device, for example, being a wireless Precision Position Tracking (PPT) device which generates one or more signals that can be detected and tracked over time by the at least two motion capture mechanisms. In these conventional operational environments, the PPT device is optionally integrated with or attached to headgear (e.g., 3D Glasses). Bulky and heavy PPT devices are difficult and uncomfortable to wear. Therefore, what is needed is a PPT device which is lightweight and compact.

SUMMARY OF THE INVENTION

An embodiment of a lightweight and compact wireless Precision Position Tracking device is enabled that works in conjunction with a Precision Position Tracking motion capture system. Optionally, the Precision Position Tracking device described in this specification includes no more than two infrared tracking/beacon light sources and a given tracking light source generates a distinct signal.

DETAILED DESCRIPTION OF PREFERRED EMBODIMENTS

Figure 1:
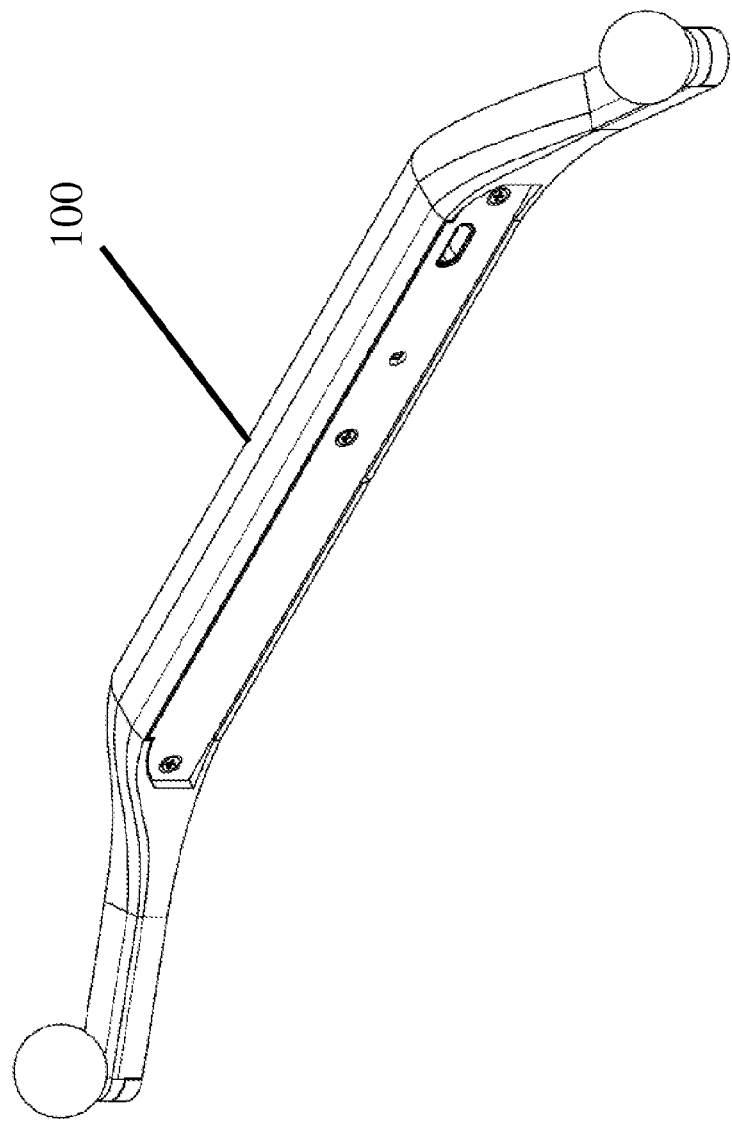
FIG. 1 illustrates an example embodiment of a precision position tracking device.

This invention relates generally to devices and methods for wireless motion tracking, and in particular, to a wireless precision position tracking device that works in conjunction with a precision position tracking motion capture system. Optionally, the precision position tracking (PPT) device can be attached to or mounted on an item worn by the user (e.g., headgear). Optionally, the device can be attached to articles of clothing and/or strapped to a user. In an example optical embodiment, the PPT device includes two light emitting components attached to one or more items worn by the user and the system tracks the light source to determine the user's movements in time. In an example embodiment, head movement tracking data is collected in substantially real-time and can be used, for example, in a virtual reality display in which some or all of the displayed images are modified coincident with the tracked movement of the user. For example, if the tracking system detects sideways movement of the user, the perspective and/or the displayed image viewed by the user is modified to simulate the sideways movement of the user (e.g., displaying an image behind a tree which was obstructing the user's view prior to the user's sideways movement). Advantageously, precision position tracking as described herein can be used in a number of application areas including but not limited to: real estate, architecture, product design, human behavior analysis, user training, gaming, product and marketing evaluation, design verification, data visualization, teleoperation, and telepresence or any physical environment that for reasons of, for example, cost or potential harm to a user can be simulated rather than directly experienced. In addition, precision position tracking as described herein may also be used in augmented reality environments, including for example, in an automotive virtual reality environment.

A device for motion tracking worn by a user is further described below. In an example optical embodiment, light is emitted from two or more respective optical markers, including for example infrared optical LEDs. The respective marker may be used to generate a unique marker ID. This marker ID device enables a tracking system to distinguish multiple points in a space with minimal or without any confusion.

An example embodiment provides a precision positioning tracking apparatus, comprising: a head mountable system, comprising: a housing configured to be worn by a person in a head region; two or more infrared Light-Emitting Diodes (LED); a battery; a position tracking device powered by the battery and positioned at least in part in the housing, the position tracking device configured to: provide orientation information to a remote device; cause a first infrared LED in the two or more infrared LEDs to emit a first repetitive pattern of infrared light pulses, wherein the first repetitive pattern of infrared light pulses comprises: a first combination of light pulses over a first period of time; and cause a second infrared LED in the two or more infrared LEDs to emit a second repetitive pattern of infrared light pulses, wherein the second repetitive pattern of infrared light pulses comprises: a second combination of light pulses over a second period of time, and wherein the second combination of light pulses is distinguishable from the first combination of light pulses, and wherein a beginning of each pattern in the first repetitive pattern and the second repetitive pattern occurs at substantially the same time; and optionally further comprising: the remote device, wherein the remote device is configured to: receive image data from one or more cameras; detect from the image data two or more distinct patterns of infrared LED light pulses; identify from the two or more distinct patterns of detected infrared LED light pulses the presence of the first signal pattern and the second signal pattern; and calculate a first orientation of the positioning tracking device based at least in part on the identified presence of the first signal pattern and the second signal pattern; and, optionally wherein the image data comprises multiple frames; and, optionally wherein the positioning tracking device is configurable to generate eight distinguishable signal patterns; and, optionally the precision positioning tracking apparatus further configured to: receive image data from one or more cameras; and detect at least one pattern of one or more infrared LED light pulses from the image data; and, optionally wherein at least one pulse period comprises a distinguishing characteristic with respect to the first repetitive pattern; and, optionally wherein the first repetitive pattern of infrared light pulses comprise light intensity state transitions; and, optionally wherein the housing is configured to be attached to an eyeglass frame; and, optionally wherein the housing comprises an eyeglass frame; and, optionally wherein the precision position tracking device is configured to provide orientation information corresponding to at least one eye of the person; and, optionally wherein the precision position tracking device is configured to provide orientation information corresponding to a head position of the person.

An example embodiment provides a precision positioning tracking apparatus, comprising: a positioning tracking device, comprising: two or more infrared Light-Emitting Diodes (LED); a housing configured to be worn by a person in a head region; a battery; a precision position tracking device powered by the battery and positioned at least in part in the housing, the precision position tracking device configured to: cause a first infrared LED in the two or more LEDs to emit a first pattern of infrared light pulses, wherein the first pattern of infrared light pulses comprises: a first combination of light pulses over a first period of time; and cause a second infrared LED in the two or more LEDs to emit a second repetitive pattern of infrared light pulses, wherein the second repetitive signal pattern of infrared light pulses comprises: a second combination of light pulses over a second period of time, and wherein the second combination of light pulses is distinguishable from the first combination of light pulses; and, optionally and, optionally further comprising a tracking system, wherein the tracking system is configured to: receive image data from one or more cameras; detect from the image data six or more infrared LED light pulses; identify from the six or more detected infrared LED light pulses the presence of the first signal pattern and the second signal pattern; and calculate a first position of the precision positioning tracking device based at least in part on the identified presence of the first signal pattern and the second signal pattern; and, optionally wherein the image data comprises multiple frames; and, optionally wherein the positioning tracking device is configurable to generate eight distinguishable signal patterns; and, optionally further comprising a tracking system, wherein the tracking system is configured to: receive image data from one or more cameras; and detect at least one pattern of one or more infrared LED light pulses from the image data; and, optionally wherein at least one pulse period comprises a distinguishing characteristic of the pattern; and, optionally wherein the first pattern of infrared light pulses comprise light intensity state transitions; and, optionally wherein the housing is configured to be attached to an eyeglass frame; and optionally wherein the housing comprises an eyeglass frame; and, optionally wherein the position tracking device is configured to provide orientation information corresponding to at least one eye of the person; and, optionally wherein the position tracking device is configured to provide orientation information corresponding to a head position of the person.

An example embodiment provides a method, comprising: receiving image data from one or more cameras; detecting from the image data two or more distinct patterns of light pulses; identifying from the two or more distinct patterns of detected light pulses a presence of a first signal pattern, emitted by a first light source, and a second signal pattern, emitted by a second light source; and calculating a first orientation of at least a portion of a person's head based at least in part on the identified presence of the first signal pattern and the second signal pattern; and, optionally wherein the first light source is an infrared LED; and, optionally wherein the first light source and the second light source are positioned on either side of the user's head; and, optionally wherein the image data comprises multiple frames; and, optionally wherein the distinct patterns comprise eight patterns; and, optionally wherein at least one pulse period comprises a distinguishing characteristic with respect to the first signal pattern; and, optionally wherein the distinctive pattern of detected light pulses comprise light intensity state transitions; and, optionally wherein the first light source and second light source is attached to an eyeglass frame; and, optionally wherein the first light source and second light source comprise an eyeglass frame; and, optionally further comprising providing orientation information corresponding to at least one eye of the person; and, optionally further comprising providing orientation information corresponding to a head position of the person.

Figure 2:
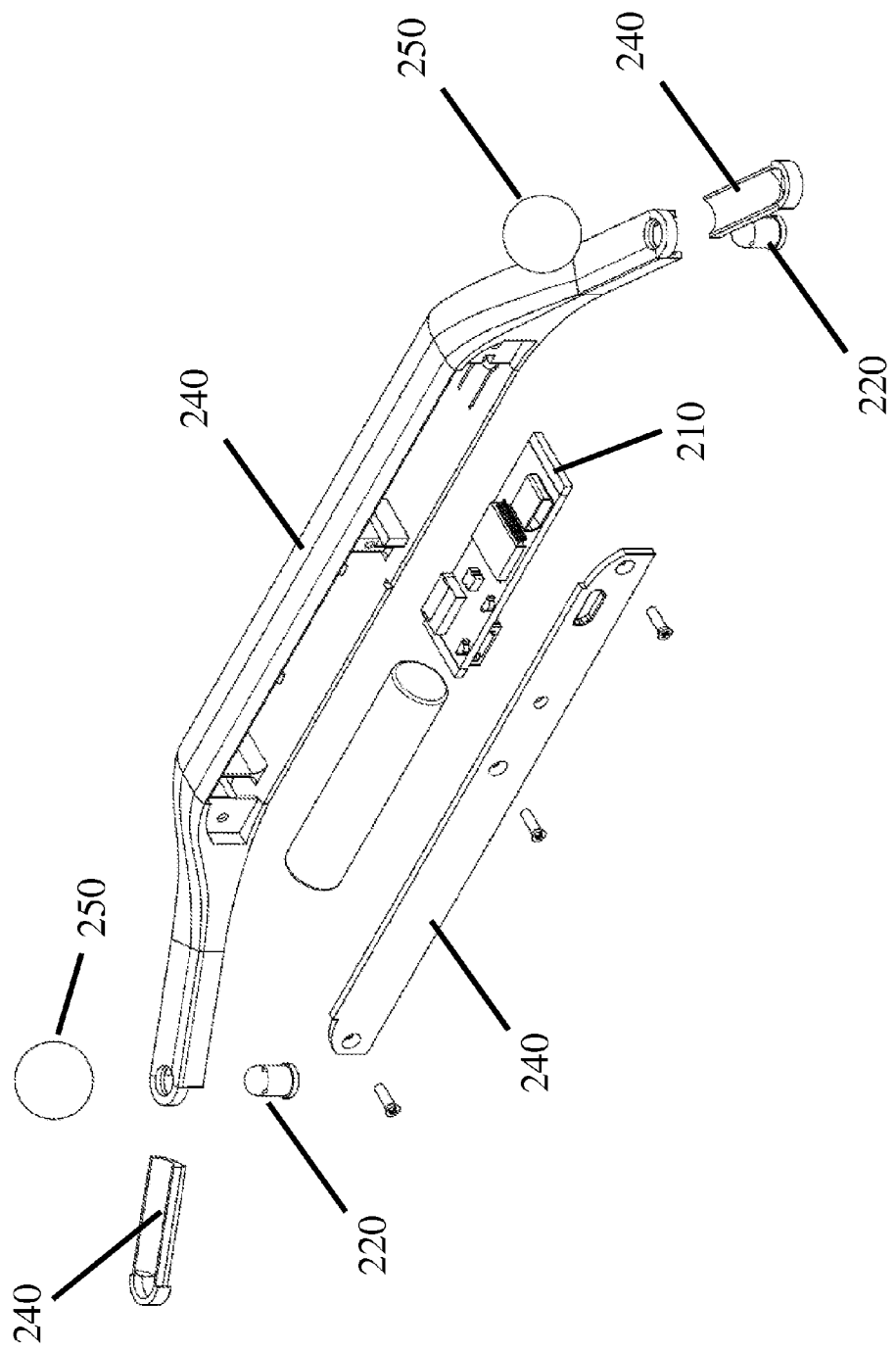
FIG. 2 an example embodiment of a precision position tracking device assembly.

The precision position tracking (PPT) device and associated precision position tracking motion capture system comprises one or more items of software and/or hardware elements. With respect to the hardware elements, the PPT tracking device may include some or all of the following: an active marker ID device 100, which may be in the form of a circuit board or integrated circuit device 210, one or more extension modules (e.g., boards) which optionally connect via cables or wires, two or more infrared LEDs 220, one or more rechargeable batteries 230 and/or other power source input, and an enclosure housing. An assembly drawing of an example PPT is illustrated in FIG. 2. The active marker ID device circuit board 210 is optionally compact in order to reduce the form factor, the weight of the PPT device, and energy consumption. For example, one embodiment of the PPT tracking device can operate up to 6 hours or more in a low light intensity mode before recharging. Optionally, the active marker ID device circuit board 210 may be a 6-layered circuit board which weighs less than 3.2 grams and which has dimensions equal to or less than 44 mm (L)×6 mm (H)×14 mm (W). The circuit board 210 optionally includes: one or more infrared LED drivers, one or more peripheral ports, one or more vibration sensors, one voltage regulator, one charge management controller, one or more RGB LED indicators, one or more random access memory cards (RAM), one or more erasable programmable read-only memory cards (EPROM), or other types of non-volatile memory which may store programs and/or data, one or more microprocessors, PIC microcontrollers, and/or signal processors which may access and execute the programs and data, connectors, test interfaces, and/or user accessible controls. Optionally, the circuit board can be expanded by connecting to another extendable circuit board or other module to support additional infrared LEDs including 3, 4, 5, 6 or more infrared LEDs.

Optionally, the left and right infrared LEDs 220 used in an example embodiment of the PPT device are powered and controlled by the active marker ID circuit device. Optionally, the infrared LEDs 220 can be powered in a low, medium, or high intensity mode. For example, the infrared LEDs might be set to a low intensity mode to conserve power if the operating environment has the PPT motion capture cameras positioned in close proximity to the PPT device. Optionally, the infrared LED is covered with a substantially transparent semi-transparent globe 250 in order to disperse the light generated by the infrared LED in a consistent and nearly 360 degree pattern. The semi-transparent globe 250 also protects the infrared LED from dust and debris. Optionally, the PPT device is powered by a single 3.7 Volt rechargeable battery 230 to minimize the overall device weight. Optionally, other batteries can be used including AAA disposable batteries.

An assembled PPT device 100 of an example embodiment is illustrated in FIG. 1. Optionally, the PPT device includes a single or multiple user-programmable control. Optionally, an externally visible LED 110 with multiple colors indicates the current program mode of the device. Optionally, the control (e.g., an external switch on the case which sets a mode or switches into program mode based on how long the switch is depressed) enables the user to monitor the power level of the battery and configure the intensity of the infrared LEDs, the IDs of the infrared LEDs (see description below), and the one or more different operational modes including for example: power saving mode, PPT motion capture system type (including for example a PPTX camera system running at 60 Hz or a PPTE camera systems running at 180 HZ, both from WorldViz, LLC of Santa Barbara, Calif.), single or multiple light modes (e.g., only left infrared LED active, only right infrared LED active, or both infrared LEDs are active). Optionally, the PPT device includes one or more user controls for device configuration management. Optionally, one or more configuration options are exposed through a GUI accessible when the PPT device is attached to a PC via USB connector. Optionally, the PPT device includes one or more RGB LED indicators displaying the state (e.g., on/off) of the PPT device. Optionally, the PPT device can be recharged such as through a 5V micro-USB port (which is optionally the same connector used for accessing the configuration GUI).

Figure 3:
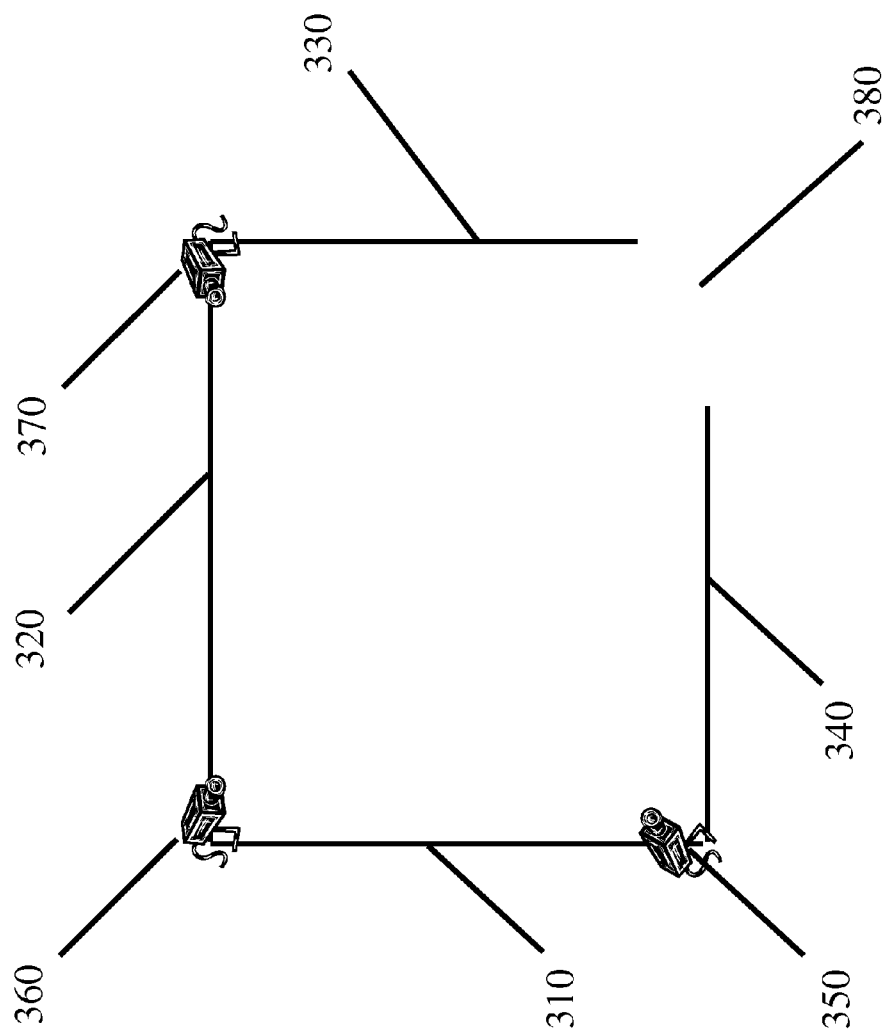
FIG. 3 illustrates an example operating environment for a precision position tracking device.

The hardware components of the PPT device are optionally enclosed in a lightweight and compact enclosure 240 (e.g., less than 15 grams) as illustrated in FIG. 3. The enclosure 240 is optionally made of lightweight and durable laser sintered nylon plastic, although other materials may be used. The enclosure 240 optionally is designed to mount a left infrared LED and a right infrared LED 220. Optionally, the enclosure 240 includes angled ends in order that the mounted infrared LEDs can be setback in line with the user's pupils. Optionally, the housing includes one or more clips used to attach the PPT device to a user's headgear. Optionally, the enclosure has two removable infrared LED panels for ease of repair access. Optionally, the enclosure has a push in button mechanism or other interface for user device programmability.

Optionally, the PPT device includes one or more vibration sensors. Optionally, the vibration sensors enable the PPT device to transition into a low energy consumption state when the device is in a fixed motion position for a configurable period of time as determined by a lack of vibration as detected by the sensor which is then read by the circuit board. Optionally, when a vibration is detected, the PPT device transitions out of the sleep state into an active infrared LED generating state. Optionally, the triggering mechanism for transition into or out of a sleep state can be configured to trigger once a threshold parameter value is reached. Optionally, the configuration parameters are established via firmware uploads or manual input to the PPT device. For example, a parameter value can be set to the number of detectable vibrations (e.g., 5 or more) in a fixed period of time. If the number of vibrations is less than the defined parameter value, during the fixed period of time (e.g. 1 minute), then the PPT device transitions into a sleep state. Optionally, there are other methods provided for managing power consumption. For example, the light intensity mode can be configured to transition to a lower intensity mode base upon device inactivity.

Optionally, the PPT device is operationally robust in noisy magnetic field environments and does not include gyros and/or accelerometers.

General Example Operation

In an example embodiment, a given infrared LED is controlled by the active marker ID controller, which may be in the form of a circuit board, an integrated circuit device, or otherwise. When activated, the infrared LEDs are optionally controlled to emit a repetitive unique pattern or constant signal to provide input position data and ID signature data recognized by the PPT motion capture system. For example, the PPT motion capture system transfers and/or streams image/video data to one or more servers for image processing including position data identification and signature recognition. For example, the left infrared LED can be configured to emit an on/off pulse sequence signal and the right infrared LED can be configured to emit a constant pulse signal. Optionally, a given infrared LED 220 can emit one of a number of different unique signatures including up to 8 or more unique signatures.

Optionally, a given infrared LED is controlled by the active marker ID controller to illuminate in one of several predefined states (e.g., low intensity, medium intensity, and high intensity; low pulse rate, medium pulse rate, high pulse rate; etc., although fewer or addition states may be provided), with corresponding state transitions as the LED is controlled to transition from one state to another state. Optionally, in an example embodiment with the states of low intensity, medium intensity, and high intensity, state transitions may include some or all of the following transitions:

Low to medium;
Medium to high;
Low to high;
High to medium;
Medium to low;
High to low.

The state changes may be configurable (e.g., via programming and/or via a user interface), where the amount of time spent in a given state may be specified. The sequencing of the various states may be used to encode signatures. Using, for example, a Manchester encoding technique, with three available states, enables the PPT device to generate 8 different binary signatures, wherein the binary signatures include:

Signature 1 [00000];
Signature 2 [00001];
Signature 3 [00011];
Signature 4 [00101];
Signature 5 [00111];
Signature 6 [01011];
Signature 7 [01111];
Signature 8 [11111].

Additional states may be used to generate additional signatures.

Optionally, the PPT device is configured such that the beginning of a unique pattern of the respective left and right infrared LEDs are synchronized to begin at substantially the same time. With respect to the pattern generation of the infrared LEDs, the PPT device is optionally configurable to be adapted to the associated PPT motion capture mechanism/cameras type. For example, with a 180 Hz camera and a marker ID generating pulses at a rate of 60 Hz, a marker ID processing module processing the marker ID needs multiple frames in order to determine the unique ID signal pattern.

With the PPT device feature of unique ID signatures from a given infrared LED, the PPT motion capture system (which optionally includes one or more cameras and/or networked servers) can accurately determine the relative position of at least two infrared LEDs (e.g., a left LED/LED cluster, and a right LED/LED cluster) and calculate the corresponding orientation information/data for the device and/or the associated headgear. Specifically, in an example embodiment, each camera of the PPT motion capture system acquires the respective left and right infrared LED positions in a 2D camera view. The 2D view from the respective PPT motion camera calculates a location, for example the center point of the respective left and right infrared LED. Optionally, the PPT motion camera itself performs the center point calculation and/or one or more associated computing devices executing a first type of PPT software (e.g., PPT Studio Software from WorldViz LLC of Santa Barbara, Calif.) by using a weighted pixel averaging method. For example, the respective infrared LED is represented by a group of pixels in a camera view (e.g., corresponding to pixels of a camera imager device). Based at least in part on the different intensities within a group of pixels, one or more algorithms may be used to determine the correct center location (e.g., center point) of the IR light. Optionally, after calculating the center point, the 2D view data from the respective PPT motion camera is processed by a second type of PPT software. The second type of PPT software (e.g., PPT Studio algorithms from WorldViz LLC of Santa Barbara, Calif.), using one or more algorithms, determines from the 2D view data yaw and roll information (e.g., with respect to a user's head, other appendage, or body). The PPT system, in this example embodiment, provides as output to a user application, for example a virtual reality application, tracking data of the user's head movements with a full 5 degrees of freedom information (Yaw, Roll, X, Y, Z). Optionally, if the PPT tracking device supports additional markers, for example, more than 2 markers, then the system in the same manner as described above can determine 6 degrees of Freedom information (Pitch, Yaw, Roll, X, Y, Z). Optionally, the PPT system may provide tracking data in additional or fewer degrees of freedom.

Advantageously, the Marker ID techniques described above provide an elegant way to enable a tracking system to distinguish multiple points in a space without or with minimal confusion. In certain other Marker ID systems that do not use a sequential pulse technique as described herein, the markers can be indistinguishable in the physical world. For example in a two infrared LED PPT device, disadvantageously the two infrared LED positions can be swapped in physical tracking space (e.g., by the user, wearing the LED head gear, making a 180 degree turn). In another example of a two infrared LED PPT device, disadvantageously two infrared LEDs which are brought together in close proximity (e.g., by the user wearing the LED head gear making a 90 degree turn) and then separated apart (by the user turning back 90 degrees) may cause the motion tracking cameras (and/or association computing devices) to lose track of which infrared LED is the left infrared LED and which infrared LED is the right infrared LED.

The example PPT's motion capture system described above also has optional distinguishing advantages over passive marker systems. Passive marker systems do not generate light but rather reflect infrared light generated by light sources which may be included in the motion tracking cameras themselves. These passive marker systems generally require 3 or more markers to generate a specific geometric shape defining a specific signature to distinguish an object. Advantageously, because certain embodiments of the PPT device optionally use fewer markers than the passive system (e.g., only two infrared LEDs or only 2 clusters of infrared LEDs), the device is relatively more compact. In addition, the active marker system using infrared LED lights has a longer range of detection as compared to the passive marker system. For example, an example embodiment of the PPT motion capture system using infrared LEDs has a range in excess of 20 meters. In addition, tracking 2 points of light is more robust than a system that requires the tracking of 3 points of light or more in order to obtain positioning and orientation information. For example, a system may, in certain uses, miss lights about 1% of the time due to occlusion and other factors. That means the system can simultaneously track 2 lights 98% of the time ($0.99^2$). If the system needs to track 4 lights simultaneously, the system can simultaneously track 4 lights only 96% of the time ($0.99^4$), and so may have twice as many tracking errors in a given scenario than a 2 light implementation.

Certain example features are further illustrated with respect to the following non-limiting example, where a user utilizes an embodiment of the PPT motion capture system to run an experiment to determine the appeal to men with respect to two different types of female models. While the experiment involves interviewing the experiment subjects before and after the viewing of images of the models, a goal of the experiment is to determine by detection of the user's body movements, and in particular the movements of the subjects head (e.g., in 5 degrees of freedom), which model is most appealing to the male subjects.

Figure 4:
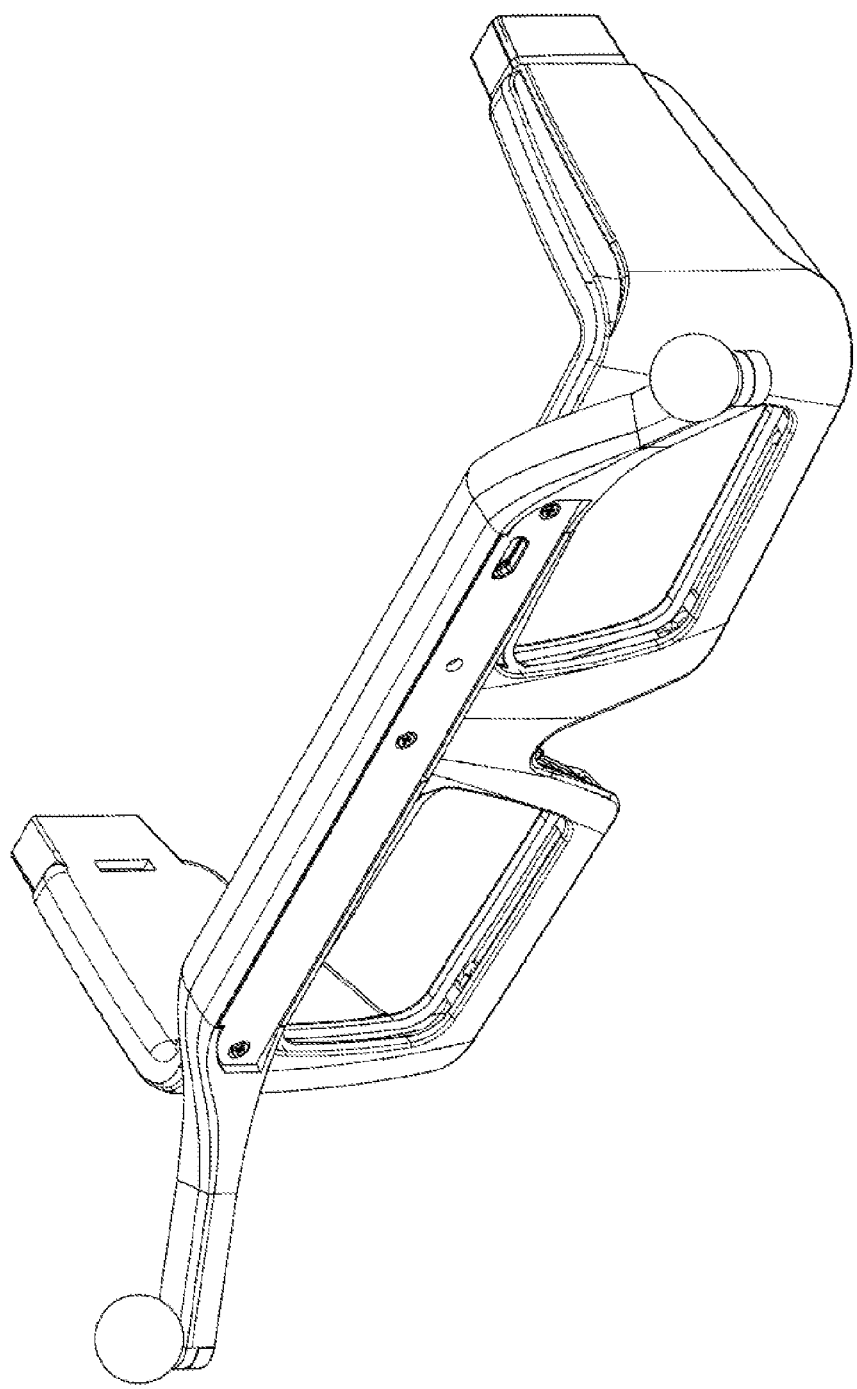
FIG. 4 illustrates an example embodiment of a precision position tracking device affixed to a pair of 3D glasses.
Figure 5:
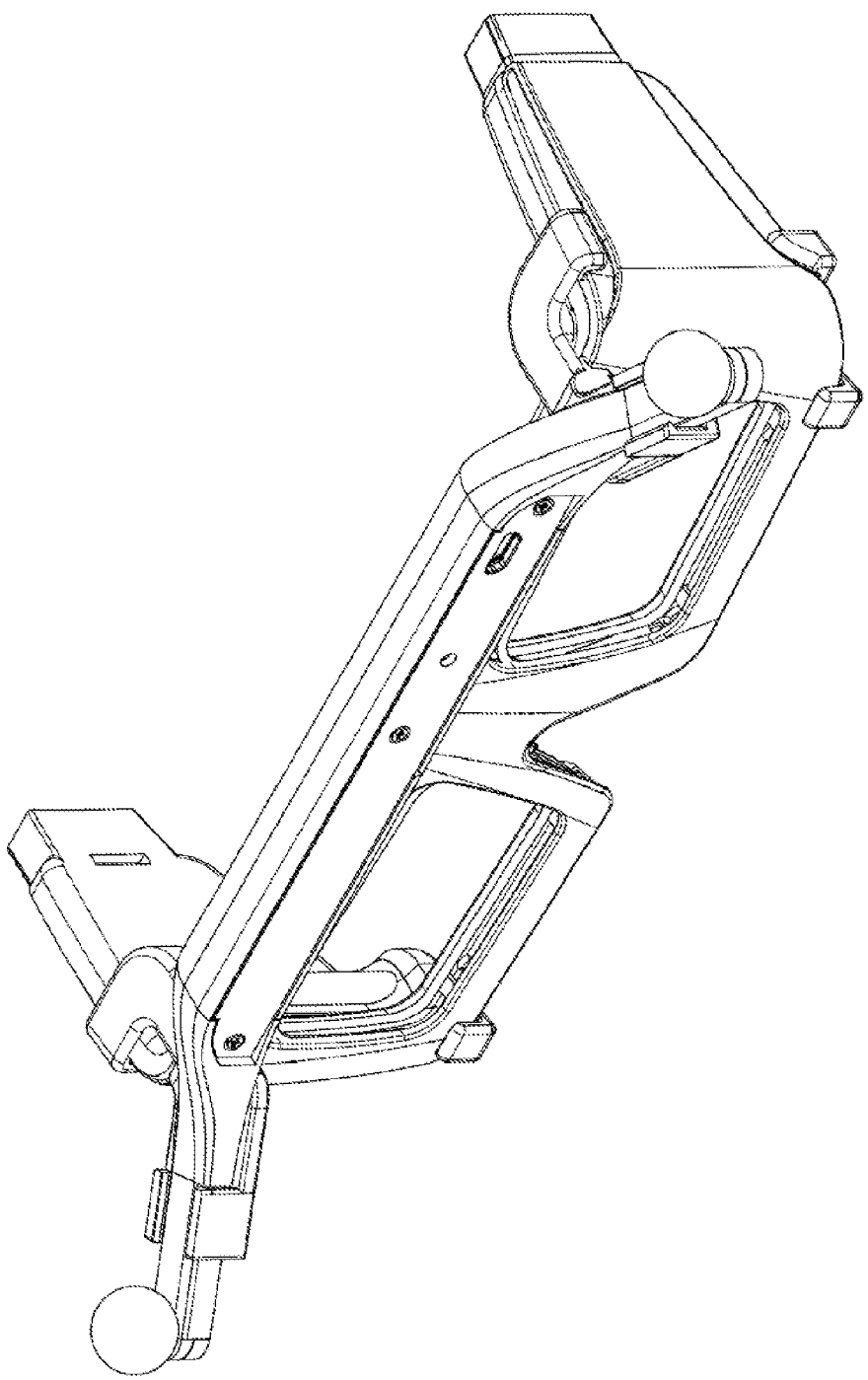
FIG. 5 illustrates an example embodiment of a precision position tracking device affixed to a pair of 3D glasses with clips.

FIG. 3 illustrates the operating environment of a first example PPT system for an illustrative application. The application in this example is user preference determination. It is understood that other operating environments may be used, with larger or smaller dimensions, different layouts, and different orientations of the PPT system. The operating environment of the experiment includes a room (e.g., a 4 square meter room) with an entry 380 in the south east corner of the room. The east 330 and south 340 walls may optionally be simply blank screens. The west 310 wall includes a 3-D projection of model A on to a screen and the north 320 wall includes a 3-D projection of model B on to a screen. Each experimental subject will wear a pair of 3-D glasses with the PPT device affixed to the glasses as illustrated in FIG. 4. Optionally each experimental subject wears a pair of 3-D glasses with the PPT device affixed to the glasses using a pair of clips as illustrated in FIG. 5. In this experiment, three video cameras are mounted approximately 3 meters above the ground. Camera 350 is mounted in the southwest corner facing inward at a 45 degree angle to the south 340 and west 310 walls and slightly downward. Camera 360 and Camera 370 are similarly mounted in the northwest corner and the northeast corner. Each of the three video cameras are connected to one or more servers executing software (e.g., PPT Studio 3D algorithms from WorldViz LLC of Santa Barbara) configured to process the streaming cameras output.

The PPT device is activated and configured to generate a repetitive marker signal 1 from the left LED and a repetitive marker signal 2 from the right LED where the marker signals generation is synchronized. The marker signal 1 and marker signal 2 are distinct signals and can be distinguished by the video cameras and associated software/servers. The three video cameras are activated and the associated server software is initialized and also activated.

A given subject enters the room wearing their 3-D glasses and is requested to look at an item in the northwest corner. The cameras and associated servers detect the LED markers. A bell or other alert signals the beginning of the experiment. A subsequent bell or other alert signals the ending of the experiment. Nearly simultaneously with the sounding of the bell a 3-D image of a model, Model A, is projected onto the west wall and a 3-D image of a second model, Model B, is projected onto the north wall The PPT system tracks and records the subject's movement from the initial sounding of the bell until the bell or other alert sounds again (e.g., approximately 1 minute later).

Subsequent to the second bell ringing, signifying the end of the experiment, the PPT system continues to track the subject's head movements. In this example, the subject turns around and exits the room. The subject is no longer facing the cameras 350-370 upon exit. Upon exit, it is possible that the all cameras have lost sight of one or both of the LEDs. As the subject begins to leave the room an audible recording of a sexy goodbye is played (e.g., Goodbye Jim). In this example, the subject's head turns slightly to the right to look at Model A. One or more of the cameras detects and records an LED signal, and from the marker ID determines that the subject made a right glance back at Model A.

What is claimed is:

1. A precision positioning tracking apparatus, comprising:
a head mountable system, comprising:
    a housing configured to be worn by a person in a head region;
    two or more infrared Light-Emitting Diodes (LED);
    a battery;
    a position tracking device powered by the battery and positioned at least in part in the housing, the position tracking device configured to:
        provide orientation information to a remote device;
        cause a first infrared LED in the two or more infrared LEDs to emit a first repetitive pattern of infrared light pulses, wherein the first repetitive pattern of infrared light pulses comprises:
            a first combination of light pulses over a first period of time; and
        cause a second infrared LED in the two or more infrared LEDs to emit a second repetitive pattern of infrared light pulses, wherein the second repetitive pattern of infrared light pulses comprises:
            a second combination of light pulses over a second period of time, and
        wherein the second combination of light pulses is distinguishable from the first combination of light pulses,
        and
        wherein a beginning of each pattern in the first repetitive pattern and the second repetitive pattern occurs at substantially the same time.

2. The precision positioning tracking apparatus of claim 1, further comprising:
    the remote device, wherein the remote device is configured to:
        receive image data from one or more cameras;
        detect from the image data two or more distinct patterns of infrared LED light pulses;
        identify from the two or more distinct patterns of detected infrared LED light pulses the presence of the first signal pattern and the second signal pattern; and,
        calculate a first orientation of the positioning tracking device based at least in part on the identified presence of the first signal pattern and the second signal pattern.

3. The precision positioning tracking apparatus of claim 2, wherein the image data comprises multiple frames.

4. The precision positioning tracking apparatus of claim 1, wherein the positioning tracking device is configurable to generate eight distinguishable signal patterns.

5. The precision positioning tracking apparatus of claim 1, the precision positioning tracking apparatus further configured to:
    receive image data from one or more cameras; and
    detect at least one pattern of one or more infrared LED light pulses from the image data.

6. The precision positioning tracking apparatus of claim 1, wherein at least one pulse period comprises a distinguishing characteristic with respect to the first repetitive pattern.

7. The precision positioning tracking apparatus of claim 1, wherein the first repetitive pattern of infrared light pulses comprise light intensity state transitions.

8. The precision positioning tracking apparatus of claim 1, wherein the housing is configured to be attached to an eyeglass frame.

9. The precision positioning tracking apparatus of claim 1, wherein the precision position tracking device is configured to provide orientation information corresponding to at least one eye of the person.

10. The precision positioning tracking apparatus of claim 1, wherein the precision position tracking device is configured to provide orientation information corresponding to a head position of the person.

11. A precision positioning tracking apparatus, comprising:
    a positioning tracking device, comprising:
        two or more infrared Light-Emitting Diodes (LED);
        a housing configured to be worn by a person in a head region;
        a battery;
        a precision position tracking device powered by the battery and positioned at least in part in the housing, the precision position tracking device configured to:
            cause a first infrared LED in the two or more LEDs to emit a first pattern of infrared light pulses, wherein the first pattern of infrared light pulses comprises:
                a first combination of light pulses over a first period of time; and
            cause a second infrared LED in the two or more LEDs to emit a second repetitive pattern of infrared light pulses, wherein the second repetitive signal pattern of infrared light pulses comprises:
                a second combination of light pulses over a second period of time, and
            wherein the second combination of light pulses is distinguishable from the first combination of light pulses.

12. The precision positioning tracking apparatus of claim 11, further comprising a tracking system, wherein the tracking system is configured to:
    receive image data from one or more cameras;
    detect from the image data six or more infrared LED light pulses;
    identify from the six or more detected infrared LED light pulses the presence of the first signal pattern and the second signal pattern; and
    calculate a first position of the precision positioning tracking device based at least in part on the identified presence of the first signal pattern and the second signal pattern.

13. The precision positioning tracking apparatus of claim 12, wherein the image data comprises multiple frames.

14. The precision positioning tracking apparatus of claim 11, wherein the positioning tracking device is configurable to generate eight distinguishable signal patterns.

15. The precision positioning tracking apparatus of claim 11, further comprising a tracking system, wherein the tracking system is configured to:
    receive image data from one or more cameras; and
    detect at least one pattern of one or more infrared LED light pulses from the image data.

16. The precision positioning tracking apparatus of claim 11, wherein at least one pulse period comprises a distinguishing characteristic of the pattern.

17. The precision positioning tracking apparatus of claim 11, wherein the first pattern of infrared light pulses comprise light intensity state transitions.

18. The precision positioning tracking apparatus of claim 11, wherein the housing is configured to be attached to an eyeglass frame.

19. The precision positioning tracking apparatus of claim 11, wherein the position tracking device is configured to provide orientation information corresponding to at least one eye of the person.

20. The precision positioning tracking apparatus of claim 11, wherein the position tracking device is configured to provide orientation information corresponding to a head position of the person.

* * * * *